(12) United States Patent
Anderson et al.

(10) Patent No.: US 11,358,907 B2
(45) Date of Patent: Jun. 14, 2022

(54) BIOLOGICAL SOLIDS PROCESSING

(71) Applicant: Schwing Bioset, Inc., Somerset, WI (US)

(72) Inventors: Thomas M. Anderson, Naples, FL (US); Charles M. Wanstrom, Maplewood, MN (US); Lakshminarasimha Krishnapura, Boca Raton, FL (US)

(73) Assignee: Schwing Bioset, Inc., Somerset, WI (US)

( * ) Notice: Subject to any disclaimer, the term of this patent is extended or adjusted under 35 U.S.C. 154(b) by 510 days.

(21) Appl. No.: 16/319,689

(22) PCT Filed: Jul. 26, 2017

(86) PCT No.: PCT/US2017/043911
§ 371 (c)(1),
(2) Date: Jan. 22, 2019

(87) PCT Pub. No.: WO2018/022734
PCT Pub. Date: Feb. 1, 2018

(65) Prior Publication Data
US 2021/0284562 A1    Sep. 16, 2021

Related U.S. Application Data

(60) Provisional application No. 62/366,797, filed on Jul. 26, 2016.

(51) Int. Cl.
*C05F 7/00* (2006.01)
*C02F 11/18* (2006.01)
(Continued)

(52) U.S. Cl.
CPC ............... *C05F 7/00* (2013.01); *C02F 1/20* (2013.01); *C02F 1/66* (2013.01); *C02F 11/185* (2013.01);
(Continued)

(58) Field of Classification Search
CPC .. C02F 1/20; C02F 1/66; C02F 11/185; C02F 2101/16; C02F 2303/02; C02F 2303/04; C05D 3/02; C05F 17/10; C05F 17/943
See application file for complete search history.

(56) References Cited

U.S. PATENT DOCUMENTS 5,417,861 A    5/1995 Burnham
5,422,015 A    6/1995 Angell et al.
(Continued)

FOREIGN PATENT DOCUMENTS

CL    2008000537 A1    7/2008
CL    2013002797 A1    7/2014
(Continued)

OTHER PUBLICATIONS

Wiebe, R. J. C. R. "The Binary System Carbon Dioxide-Water under Pressure." Chemical reviews 29, No. 3 (1941): 475-481. (Year: 1941).*
(Continued)

*Primary Examiner* — Chester T Barry
(74) *Attorney, Agent, or Firm* — Kinney & Lange, P.A.

(57) ABSTRACT

A method of processing biological solids includes blending a sludge with calcium oxide and delivering the blended sludge and calcium oxide to a pressurized container; injecting, into the blended sludge and calcium oxide in the pressurized container, an additive capable of exothermic reactions with the calcium oxide; regulating pH in the pressurized container to produce class A biological solids from the sludge; and pumping the blended sludge, calcium
(Continued)

oxide, and additive from the pressurized container to a reactor. A system used for this process include sources of calcium oxide and biological solids, an additive injector, and a pressurized reactor.

24 Claims, 2 Drawing Sheets

(51) Int. Cl.
| | |
|---|---|
| *C05F 17/943* | (2020.01) |
| *C05F 17/10* | (2020.01) |
| *C02F 1/20* | (2006.01) |
| *C02F 1/66* | (2006.01) |
| *C05D 3/02* | (2006.01) |
| *C02F 101/16* | (2006.01) |

(52) U.S. Cl.
CPC ............... *C05D 3/02* (2013.01); *C05F 17/10* (2020.01); *C05F 17/943* (2020.01); *C02F 2101/16* (2013.01); *C02F 2303/02* (2013.01); *C02F 2303/04* (2013.01)

(56) References Cited

U.S. PATENT DOCUMENTS

| | | |
|---|---|---|
| 5,868,942 A | 2/1999 | Boss et al. |
| 2011/0154873 A1 | 6/2011 | Burnham et al. |
| 2012/0247164 A1 | 10/2012 | Dahms et al. |

FOREIGN PATENT DOCUMENTS

| | | |
|---|---|---|
| EP | 2757076 A1 | 7/2014 |
| EP | 2998277 A1 | 3/2016 |
| WO | WO2008102180 A1 | 8/2008 |

OTHER PUBLICATIONS

Jimoh, O., Synthesis of precipitated calcium carbonate: a review, Carbonates Evaporites (2018) 33:331-346, https://doi.org/10.1007/s13146-017-0341-x (Year: 2018).*

International Preliminary Report on Patentability on International Patent Application No. PCT/US2017/043911, dated Jan. 29, 2019, 10 pages.

Chilean Office Action for Chilean Patent Application No. 00202-2019, dated Oct. 14, 2019, 19 pages.

Schwing Bioset, USEPA PEC Committe Grants PFRP Approval to the Bioset System, 2011. Retrieved from the Internet: http://www.schwingbioset.com/news/bid/80709/USEPA-PCE-Committee-Grants-PFRP-Approval-to-the-Brioset-System.

Trojak, "How Transitioning to Class A Biosolids Saves Money," Schwing Bioset, Feb. 2016, Retrieved from Internet: http://www.schwingbioset.com/news/how-transitioning-to-class-a-biosolids-saves-money.

International Search Report and Written Opinion for PCT Application No. PCT/US2017/43911, dated Oct. 5, 2017, pp. 11.

Extended European Search Report for European Patent Application No. 17835193.8, dated Feb. 12, 2020, 7 pages.

* cited by examiner

BIOLOGICAL SOLIDS PROCESSING

BACKGROUND

This application relates generally to processes for the treatment of biological sludge, and specifically to processing biological sludge such that bacteria, viruses, parasites, and other pathogens are reduced, and to produce biological solids as characterized by the U.S. Environmental Protection Agency ("EPA").

Traditionally, biological solids are processed in a method mixing lime with sludge to sterilize the sludge. Mixing lime into biological solids in a pressurized container allows for increased temperature due to exothermic reactions of lime and biological solids, and an increased pH of the sludge. This results in processed biological solids that meet class A requirements for heating, pH, and water content under the EPA, which can be legally used as fertilizers. This method, referred to as the "Bioset Method," is described in detail in U.S. Pat. Nos. 5,635,069, 5,868,942, 6,056,880, 6,214,064, and 6,221,261.

However, as the additives must be purchased, there is an operating cost associated with these technologies to create the necessary high temperature environment inside a reactor pipeline. Therefore, it is advantageous to find a combination of additives that can attain the same elevated temperature and pH conditions to reduce the operating expenses of these technologies.

SUMMARY

A process for treating pathogen-containing sludge of biological solids includes blending a sludge with calcium oxide and delivering the blended sludge and calcium oxide to a pressurized container; injecting, into the blended sludge and calcium oxide in the pressurized container, an additive capable of exothermic reactions with the calcium oxide; regulating pH in the pressurized container to produce class A biological solids from the sludge; and pumping the blended sludge, calcium oxide, and additive from the pressurized container to a reactor.

A system for treating pathogen-containing sludge of biological solids includes a storage container configured to hold calcium oxide, a biological solids conveyer configured to move biological solids, an acid container configured to hold acid, a twin-screw mixer configured to mix the calcium oxide, the biological solids, and the acid into a sludge, a piston pump fluidly connected to the twin-screw mixer, the piston pump configured to move the sludge, a reactor connected to the piston pump and configured to the sludge, an injector configured to inject an additive capable of exothermic reactions with the calcium oxide into the system upstream of the reactor, and a recovery system configured to receive and process the sludge.

DETAILED DESCRIPTION

This application proposes a method of processing biological solids using calcium oxide (CaO) in conjunction with an additive such as carbon dioxide ($CO_2$). The use of an additive allows exothermic reactions to occur inside a pressurized reactor containing watered down biological solids ("sludge"), and increases the temperature and pH of the sludge such that the resulting product meets "class A" biosolid requirements as dictated by the EPA. The resulting product can then be used as fertilizer.

Figure 1:
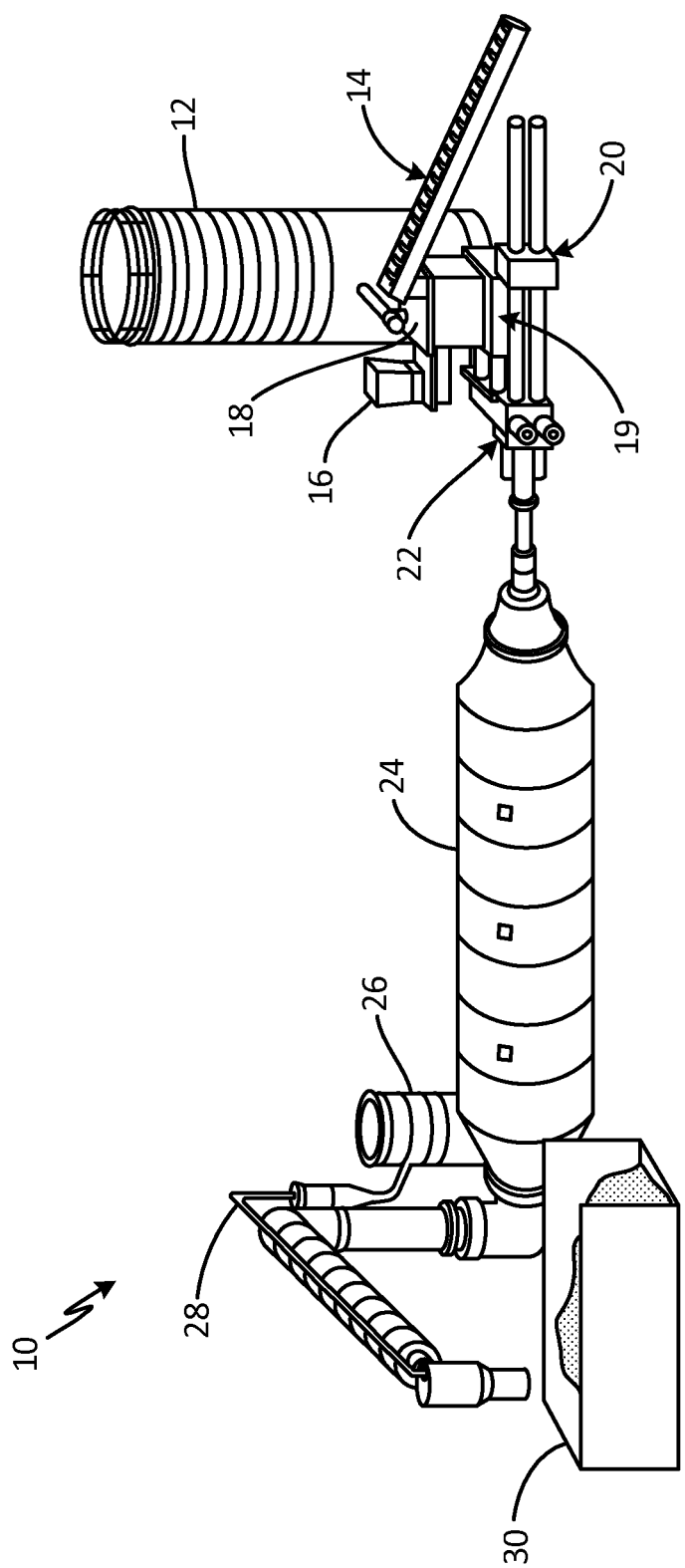
FIG. 1 depicts a schematic drawing of a biological solids processing system.

FIG. 1 depicts a schematic drawing of biological solids processing system 10, which includes lime storage 12, biological solids feed screw 14, acid storage 16, hopper 18, auger 19, piston pump 20, additive injector 22, reactor 24, water scrubber 26, vapor and odor recovery mechanism 28, and recovery station 30. In system 10, lime storage 12, biological solids feed screw 14, and acid storage 16 feed into hopper 18, which in turn sends resulting sludge into piston pump 20. Additive injector inserts an additive into system 10 in an enclosed, pressurized space downstream of auger 19, wherein the additive is mixed with the sludge. Sludge is then fed into piston pump 20 and pumped to reactor 24 where sludge is treated. Reactor 24 sends treated biological solids into vapor and odor recovery 28, where recovery mechanism 28 and water scrubber 26 further treat biological solids. Recovered items end in recovery station 30.

Lime storage 12 holds calcium oxide (CaO), often referred to as "quick lime." Calcium oxide can be mixed with biological solids to induce exothermic and pH altering reactions. Alternatively, calcium oxide can be derived from fly ash, bed ash, gypsum, low grade lime, kiln dust, or other appropriate sources of lime. Lime storage 12 is connected to hopper 18 such that calcium oxide can be delivered into hopper 18, typically by a quick lime screw feed.

Biological solids feed screw 14 feeds biological solids into system 10. Feed screw 14 is a conveyer, and can alternatively be a belt conveyor, drag chain, or other suitable conveyance. Biological solids include organic matter from sewage. Biological solids feed screw 14 delivers biological solids needing processing to hopper 18 in system 10, where the biological solids are mixed with calcium oxide. Acid storage 16 contains sulfamic acid or other appropriate acid that will be mixed in hopper 18 with biological solids and calcium oxide. Acids are delivered to hopper 18 by a feeder.

Hopper 18 is a totally enclosed hopper that contains all dust and odors, and receives calcium oxide, biological solids, and acid. A counter-rotating, intermeshing, twin-screw auger 19 downstream of hopper 18 provides efficient homogenization of the biological solids and chemicals, producing sludge. Preferably, auger 19 is a twin-screw design for more efficient mixing, though other configurations can be leveraged to mix the sludge with additives.

The sludge is delivered to pump 20, can be, for example, a positive displacement piston pump capable of pumping organic materials up to 50% solids content at pressures over 1,500 psi. Piston pump 20 can also include a poppet valve discharge assembly that allows the use of a sludge flow measuring system that can determine within 5% of the amount of biological solids pumped through piston pump 20.

Additive injector 22 is located downstream of twin screw auger 19 under hopper 18, but upstream to piston pump 20. Additive injector 22 is attached to a pressured, sealed compartment in system 10, through which sludge flows between twin screw auger 19 and piston pump 20. This is the preferred location as it the lowest pressure area to inject a gaseous additive. Other locations in the system could be contemplated. Additive injector 22 inserts an additive (either gaseous or liquid, although a liquid additive could instead be inserted into hopper 18) into the sludge prior to sludge entering reactor 24. The additive is a chemical that will exothermically react with calcium oxide and other compounds (for example, byproducts of a calcium oxide reaction), driving up the temperature of the sludge when it is in reactor 24.

Reactor 24 is an enclosed Pipeline through which sludge is pumped. Reactor 24 is enclosed to container odor and dust, and thermally insulated. Temperature sensors in reactor 24 monitor temperature ranges of the sludge. In reactor 24 of system 10, the reaction of lime with water in the sludge elevates the temperature of the sludge. Specific methods include using a mixture of lime (calcium oxide) and the additive (such as carbon dioxide) leveraged to increase the temperature of biological sludge between 70 and 55° C. under pressurized conditions. Specific required temperatures are a function of a formula provided by the EPA. The higher the temperature, the shorter the retention time required in the reactor. Under the EPA, 55° C. is the minimum temperature allowed for biological solid processing, while temperatures above 70° C. are not common. Such reactions increase pH of the sludge and result in the release of ammonia naturally present in the sludge at elevated pH and temperature. The temperature and ammonia act as the stressors to reduce pathogens in the sludge. Thus, no external heat is required. These reactions are discussed in more detail with reference to FIG. 2.

Water scrubber 26 is downstream of reactor 24 and serves as an ammonia scrubber and collection line with typically 1 to 10 gpm of water flow. Vapor and odor recovery 28 is an odor control hood to regulate outgoing sludge, which has been temperature and pH regulated in reactor 24. Recovery 30 collects end products from system 10. Recovery 30 leads to the scrubber 26. A blower associated with scrubber 26 pulls air through vapor and odor recovery 28 on the discharge of sludge, through recovery 30 and into water scrubber 26. This allows for capture of ammonia evolved in system 10. The ammonia is dissolved in water recycled for other use. In the case of making ammonia sulfate or the other fertilizers downstream of reactor 24, water scrubber 26 is replaced with alternate technologies. This type of device would utilize sulfuric acid rather than water to react with the ammonia to product ammonium sulfate fertilizer.

Figure 2:
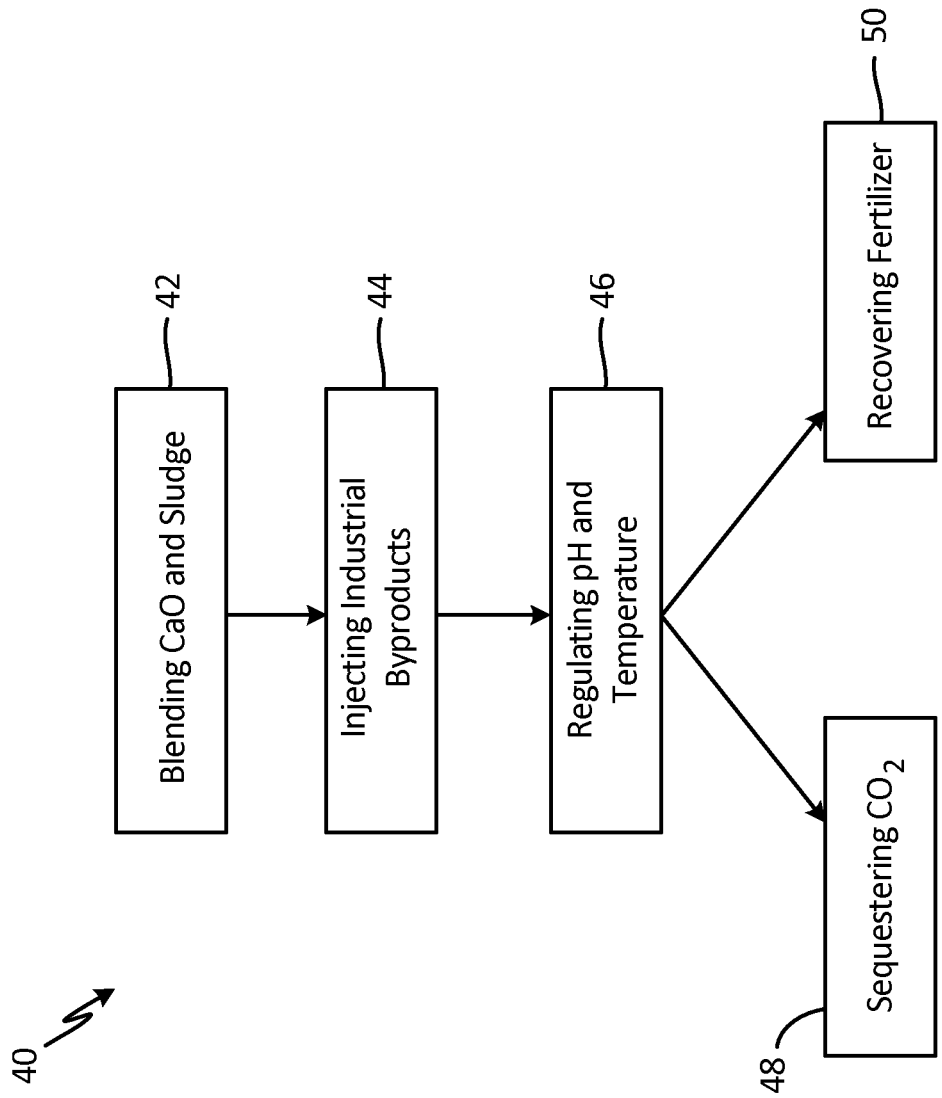
FIG. 2 is a flowchart depicting a method of processing biological solids.

FIG. 2 is a flowchart depicting method 40 of processing biological sludge. Method 40 includes blending calcium oxide and biological sludge in a pressurized container (step 42), injecting one or more industrial byproducts capable of exothermic reactions with the calcium oxide into the pressurized container (step 44), and regulating the pH and temperature in the pressurized container to produce class A biological solids (step 46). Method 30 optionally includes sequestering carbon dioxide generated in the pressurized container (step 48), recovering fertilizer products from an exothermic reaction between the calcium oxide and the industrial byproduct (step 50), and/or scrubbing ammonia with spent sulfuric acid to precipitate ammonium sulfate in the pressurized container (step 52).

Process 40 begins with mixing calcium oxide into biological solids as described in reference to FIG. 1 (step 42). Added calcium oxide reacts exothermically in biological solid sludge as it reacts with water present in the sludge. The reaction for the exothermic hydrolysis of anhydrous calcium oxide is shown below (Where $\Delta H_f^o$ represents standard enthalpy of formation in kJ/mol):

$$CaO+H_2O \rightarrow Ca(OH)_2$$

$$\Delta H_f^o = -65.05 KJ/gmol$$

The moles of calcium oxide to raise the sludge to 55° C. is 1.92 moles (56 grams/mole) or 107.7 grams per liter of calcium oxide. The dry weight of calcium oxide to sludge is 107.7 grams of lime to 200 grams of sludge or about 0.53 pounds of anhydrous lime to pound of sludge. Thus, addition of calcium oxide to sludge results in heat production and increased temperature inside reactor 24 of FIG. 1, hut a large quantity of calcium oxide is required. Chemical Calcium Oxide, or "quick lime," used in this alkaline stabilization process is a major cost component and alternatives to decrease the quantity of calcium oxide consumed are preferred.

Thus, in step 44, an additive is injected into system 10 to reduce consumption of calcium oxide but maintain high levels of heat inside reactor 24 to create class A biosolids. One additive that may be used is carbon dioxide ($CO_2$). Reaction between calcium oxide and carbon dioxide, along with other similar reactions, produce more heat than simply adding Calcium Oxide and allowing it to react with water. Specifically, addition of an additive such as carbon dioxide reduces the amount of calcium oxide required by about 60% (1.92 moles versus 0.80 moles).

A multitude of exothermic reactions occur when carbon dioxide is added to the sludge and calcium oxide mixture. First, the reaction between carbon dioxide and calcium oxide to form calcium carbonate ($CaCO_3$) occurs:

$$CaO+CO_2 \rightarrow CaCO_3$$

This reaction creates an enthalpy change of $\Delta H_f^o = -158$ KJ/gmol.

Meanwhile, carbon dioxide also reacts with water to form carbonic acid and calcium oxide reacts with water to form calcium hydroxide, with the following enthalpy changes:

$$CO_2+H_2O \rightarrow H_2CO_3$$

$$\Delta H_f^o = 0.0 KJ/gmole$$

$$CaO+H_2O \rightarrow Ca(OH)_2$$

$$\Delta H_f^o = -65 KJ/gmole$$

Subsequently, calcium oxide reacts with the carbonic acid to produce calcium carbonate and water, and carbon dioxide reacts with the calcium hydroxide to form calcium carbonate and water, with the following enthalpy changes:

$$CaO+H_2O_3 \rightarrow CaCO_3+H_2O$$

$$\Delta H_f^o = -158 KJ/gmole$$

$$CaO(OH_2O+CO_2 \rightarrow CaCO_3+H_2O$$

$$\Delta H_f^o = -93 KJ/gmole$$

Finally, calcium hydroxide additionally reacts with carbonic acid to produce calcium carbonate and water, while calcium oxide reacts with hydronium ions to form calcium cation and water with the following enthalpy changes:

$$Ca(OH)_2+H_2CO_3 \rightarrow CaCO_3+2H_2O$$

$$\Delta H_f^o = -93 KJ/gmole$$

$$CaO(OH_2 2H^+ \rightarrow Ca^{+2}+2H_2O$$

$$\Delta H_f^o = -134 KJ/gmole$$

These reactions all occur within reactor 24 of system 10 where calcium oxide and carbon dioxide are mixed with the sludge. The sum of these reactions produces a sufficient amount of enthalpy to heat reactor 24 up to desired temperatures for processing biological solid sludge.

However, using carbon dioxide to react with calcium oxide to generate more heat requires proper mixing of the gaseous carbon dioxide and calcium oxide. This can be challenging, as the gas quickly dissipates into the available air space above the biological solids through conveyors, mixers, and other non-pressurized processes. In addition, heat generated is lost quickly without an insulated closed system furthermore, ammonia released a byproduct of high temperature and elevated pH and an essential component of pathogen reduction will be lost in the open system.

Thus, in step 44, carbon dioxide (or other appropriate additives) are added either in liquid or gas form into the sludge and calcium oxide matrix by injecting into an area of a pressurized system that is already pressurized and the carbon dioxide and other suitable chemical additives remain intimately in contact with the biological solids and calcium oxide. In system 10, the additive is added into the feed zone of a pump as described in reference to FIG. 1. However, carbon dioxide and any other suitable chemical additives could be injected anywhere within the pressurized system. In system 10, the location of injector 22 shown in FIG. 1 is a preferred location. This is because at that point in system 10, the pressures needed to inject a gaseous additives are at their lowest point requiring the least amount of energy to accomplish the task. Additionally, the combined sludge mixture is still being mixed as it passes through piston pump 22, allowing a more efficient homogeneous mixing between the sludge and the additive, enabling a more complete, efficient process.

Alternatively, in step 44, a different additive can be used instead of carbon dioxide. If carbon dioxide is still preferred but unavailable, carbonic acid can be used. Otherwise, inorganic acids such as sulfuric, nitric, and phosphoric acids will react with hydrated calcium oxide and reduce the amount of calcium oxide necessary to maintain high temperatures in reactor 24. These additives have slightly different results in enthalpy changes, require different amounts of additives, and additionally allow for recovery of different fertilizers from the sludge.

The following reaction shows use of hydronium as an additive, along with the change in enthalpy:

$$Ca(OH)_2 + 2H^+ \rightarrow Ca^{+2} + 2H_2O$$

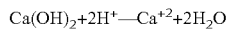

$\Delta H_f^\circ = -133.6 KJ/\text{gmole}$

This reaction is intended to show the general chemical reactions and enthalpy result for use of an inorganic acid with calcium oxide in system 10.

The following reaction shows use of sulfuric acid as an additive (instead of carbon dioxide), along with the change in enthalpy:

$$Ca(OH)_2 + H_2SO_4 \rightarrow CaSO_4 \cdot 2H_2O$$

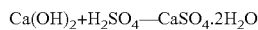

$\Delta H_f^\circ = -226.6 KJ/\text{gmole}$

Sulfuric acid requires a dry weight of 0.29 pounds sulfuric acid to every 1 pound of biological solids to heat one liter of sludge to 55° C. Use of sulfuric acid allows recovery of ammonium sulfate fertilizer at the end of the process. Spent sulfuric acid (that is, sulfuric acid post exothermic reaction) can be recovered with naturally released ammonia to produce this fertilizer.

The following reaction shows use of nitric acid as an additive, along with the change in enthalpy:

$$Ca(OH)_2 + 2HNO_3 \rightarrow Ca(NO_3)_2 + 2H_2O$$

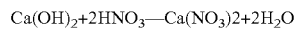

$\Delta H_f^\circ = -192.47 KJ/\text{gmole}$

Nitric acid requires a dry weight of 0.20 pounds nitric acid to every 1 pound of biological solids to heat one liter of sludge to 55° C. Use of nitric acid allows recovery of ammonium nitrate fertilizer at the end of the process. Thus, nitric acid both provides heat for the process and fertilizer.

The following reaction shows use of phosphoric acid as an additive, along with the change in enthalpy:

$$Ca(OH)_2 + \tfrac{2}{3}H_3PO_4 \rightarrow \tfrac{1}{3}Ca_3(PO_4)_2 + 2H_2O$$

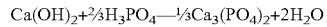

$\Delta H_f^\circ = -175.72 KJ/\text{gmole}$

Phosphoric acid requires a dry weight of 0.60 pounds phosphoric acid to every 1 pound of biological solids to heat one liter of sludge to 55° C. Use of phosphoric acid allows recovery of ammonium phosphate fertilizer at the end of the process. Any of these acids (or carbon dioxide) used as additives can regulate the temperature in reactor 24 as necessary.

Additionally, to make biological solids categorized as Class A by the EPA, an additional level of treatment by pH is necessary. Thus, step 46 includes pH regulation of the sludge. The calcium oxide, in addition to providing the heat of reaction, also provides the increase in pH. The limiting reaction is the temperature, which requires more calcium oxide than necessary to achieve the proper pH.

If more heat is available with the carbon dioxide (or other additive) and calcium oxide reactions, less calcium oxide can be used which will lower the overall operating expenses for the treatment process. This additional heat also allows the opportunity for lower cost calcium oxide sources that can be used to generate the necessary heat and also achieve the required pH. Sources such as waste products from power plants such as fly ash, bottom ash, and calcium carbonate (aka synthetic gypsum) as well as low grade lime and kiln dust from the lime kilns which can be obtained for significantly lower cost than calcium oxide can now be considered. Other alkaline products (aside from calcium oxide) can also be used to provide the heat and pH adjustment required for Class A biological solids. Other alkaline products can also be blended with calcium oxide or the above waste products in the biological solids treatment process.

If carbon dioxide is used, then in step 44, carbon dioxide can ideally be extracted from the wastewater plant at a low cost to further reduce expenses. Wastewater plants utilizing Biological Nutrient Removal processes are a multi-stage process wherein one of the stages naturally produces carbon dioxide from the respiration of the organisms in that stage. Wastewater Plants utilizing anaerobic digestion and producing combustible gases for power production and other uses, the by-products of this combustion also produce carbon dioxide that can also be recovered. Other sources within the plant are potentially available and all carbon dioxide could be harvested and injected into the process to lower costs.

Additionally, the wastewater treatment plant can now reduce their greenhouse gas output by sequestering the recovered carbon dioxide within the plant primarily as Calcium Carbonate ($CaCO_3$), which is the primary byproduct of the carbon dioxide reactions within the residual Class A biological solids product. Alternatively, if carbon dioxide is injected earlier in the process it will automatically be sequestered as calcium carbonate—this would not be a separate fertilizer that is recovered. Separate fertilizer recovery only occurs if the water scrubber of FIG. 1 is replaced with an ammonia sulfate system where sulfuric acid is the additive.

Optionally, in step 50, fertilizer can be recovered from system 10. As described in reference to step 46, depending on the additive used, ammonium sulfate fertilizer, nitrate fertilizer, or phosphate fertilizer can be recovered. These compounds are created by reactions between the inorganic acid additive and the ammonium molecules evolved during pH regulation of the sludge by calcium oxide. For example, ammonia may be scrubbed with spent sulfuric acid (or other inorganic acid) to precipitate ammonium sulfate (or other fertilizers).

Method 40 allows for efficient, cost-effective processing of biological solids leveraging quick lime (calcium oxide) and additives that exothermically react with the quick lime and biological solid sludge. Additionally, carbon dioxide can be sequestered and recycled if carbon dioxide is used as the additive. Alternatively, fertilizers can be recovered from inorganic acids used as additives.

Although the present invention has been described with reference to preferred embodiments, workers skilled in the art will recognize that changes may be made in form and detail without departing from the spirit and scope of the invention.

The invention claimed is:

1. A process for treating pathogen-containing sludge of biological solids comprises:
   blending a sludge with an alkaline product;
   delivering the sludge and the alkaline product to a pressurized container;
   injecting an additive into the sludge and the alkaline product, wherein the additive is selected from the group consisting of carbon dioxide, phosphoric acid, sulfuric acid, nitric acid, sulfamic acid, carbonic acid, hydronium ions, and combinations thereof;
   pumping the sludge, the alkaline product, and the additive from the pressurized container to a reactor;
   regulating pH and temperature in the reactor to reduce the pathogens in the sludge;
   delivering the sludge to a vapor and odor recovery mechanism;
   scrubbing ammonia from the sludge; and
   delivering the sludge to a recovery station.

2. The process of claim 1, wherein the alkaline product is selected from the group consisting of calcium oxide, fly ash, bed ash, calcium carbonate, low grade lime, kiln dust, and combinations thereof.

3. The process of claim 1, wherein the sludge is between 50% and 95% water by weight.

4. The process of claim 1, wherein the additive is injected into the pressurized container as a liquid or a gas.

5. The process of claim 1, wherein ammonia is scrubbed from the sludge with an air blower and is dissolved into a spent additive selected from the group consisting of spent sulfuric acid, spent nitric acid, spent phosphoric acid, and combinations thereof.

6. The process of claim 1, further comprising recovering fertilizer products from an exothermic reaction between the alkaline product and the additive.

7. The process of claim 1, wherein ammonia is scrubbed from the sludge with an air blower and is dissolved into water.

8. The process of claim 1, wherein the blending and delivering occur via a delivery mechanism selected from the group consisting of a belt conveyor, a conveyer, a drag chain, a feed screw, a hopper, a twin-screw auger, and combinations thereof.

9. A system for treating pathogen-containing sludge of biological solids, the system comprising:
   a first delivery mechanism that mixes the sludge and an alkaline product;
   a pressurized container that receives and temporarily holds the sludge and the alkaline product;
   an injector that injects an additive into the sludge and the alkaline product;
   a temperature and pressure controlled reactor in which the alkaline product and the additive produce an exothermic reaction that reduces pathogens within the sludge;
   a vapor and odor recovery mechanism that scrubs ammonia from the sludge;
   a recovery station that receives the sludge after processing; and
   a second delivery mechanism that transports the sludge, the alkaline product, and the additive from the pressurized container to the reactor, from the reactor to the vapor and odor recovery mechanism, and from the vapor and odor recovery mechanism to the recovery station.

10. The system of claim 9, wherein the alkaline product is selected from the group consisting of calcium oxide, fly ash, bed ash, calcium carbonate, low grade lime, kiln dust, and combinations thereof.

11. The system of claim 9, wherein the sludge is between 50% and 95% water by weight.

12. The system of claim 9, wherein the additive is selected from the group consisting of carbon dioxide, phosphoric acid, sulfuric acid, nitric acid, sulfamic acid, carbonic acid, hydronium ions, and combinations thereof.

13. The system of claim 9, wherein the additive is injected into the pressurized container as a liquid or a gas.

14. The system of claim 9, wherein the recovery station recovers fertilizer products from the exothermic reaction between the alkaline product and the additive.

15. The system of claim 9, wherein ammonia is scrubbed from the sludge by the vapor and odor recovery mechanism with an air blower and is dissolved into water.

16. The system of claim 9, wherein ammonia is scrubbed from the sludge by the vapor and odor recovery mechanism with an air blower and is dissolved into a spent additive selected from the group consisting of spent sulfuric acid, spent nitric acid, spent phosphoric acid, and combinations thereof.

17. The system of claim 9, wherein the first delivery mechanism and the second delivery mechanism are selected from the group consisting of a belt conveyor, a conveyer, a drag chain, a feed screw, a hopper, a twin-screw auger, and combinations thereof.

18. A process for treating pathogen-containing sludge of biological solids comprises:
   blending a sludge with an alkaline product;
   delivering the sludge and the alkaline product to a pressurized container;
   injecting an additive into the sludge and the alkaline product;
   pumping the sludge, the alkaline product, and the additive from the pressurized container to a reactor;
   regulating pH and tern perature in the reactor to reduce the pathogens in the sludge;
   delivering the sludge to a vapor and odor recovery mechanism;
   scrubbing ammonia from the sludge, wherein the ammonia is scrubbed from the sludge with an air blower and is dissolved into a spent additive selected from the group consisting of spent sulfuric acid, spent nitric acid, spent phosphoric acid, and combinations thereof; and delivering the sludge to a recovery station.

19. The process of claim 18, wherein the alkaline product is selected from the group consisting of calcium oxide, fly ash, bed ash, calcium carbonate, low grade lime, kiln dust, and corn binations thereof.

20. The process of claim 18, wherein the sludge is between 50% and 95% water by weight.

21. The process of claim 18, wherein the additive is selected from the group consisting of carbon dioxide, phosphoric acid, sulfuric acid, nitric acid, sulfamic acid, carbonic acid, hydronium ions, and combinations thereof.

22. The process of claim 18, wherein the additive is injected into the pressurized container as a liquid or a gas.

23. The process of claim 18, further comprising recovering fertilizer products from an exothermic reaction between the alkaline product and the additive.

24. The process of claim 18, wherein the blending and delivering occur via a delivery mechanism selected from the group consisting of a belt conveyor, a conveyor, a drag chain, a feed screw, a hopper, a twin-screw auger, and combinations thereof.

\* \* \* \* \*